United States Patent Office 2,772,406
Patented Nov. 27, 1956

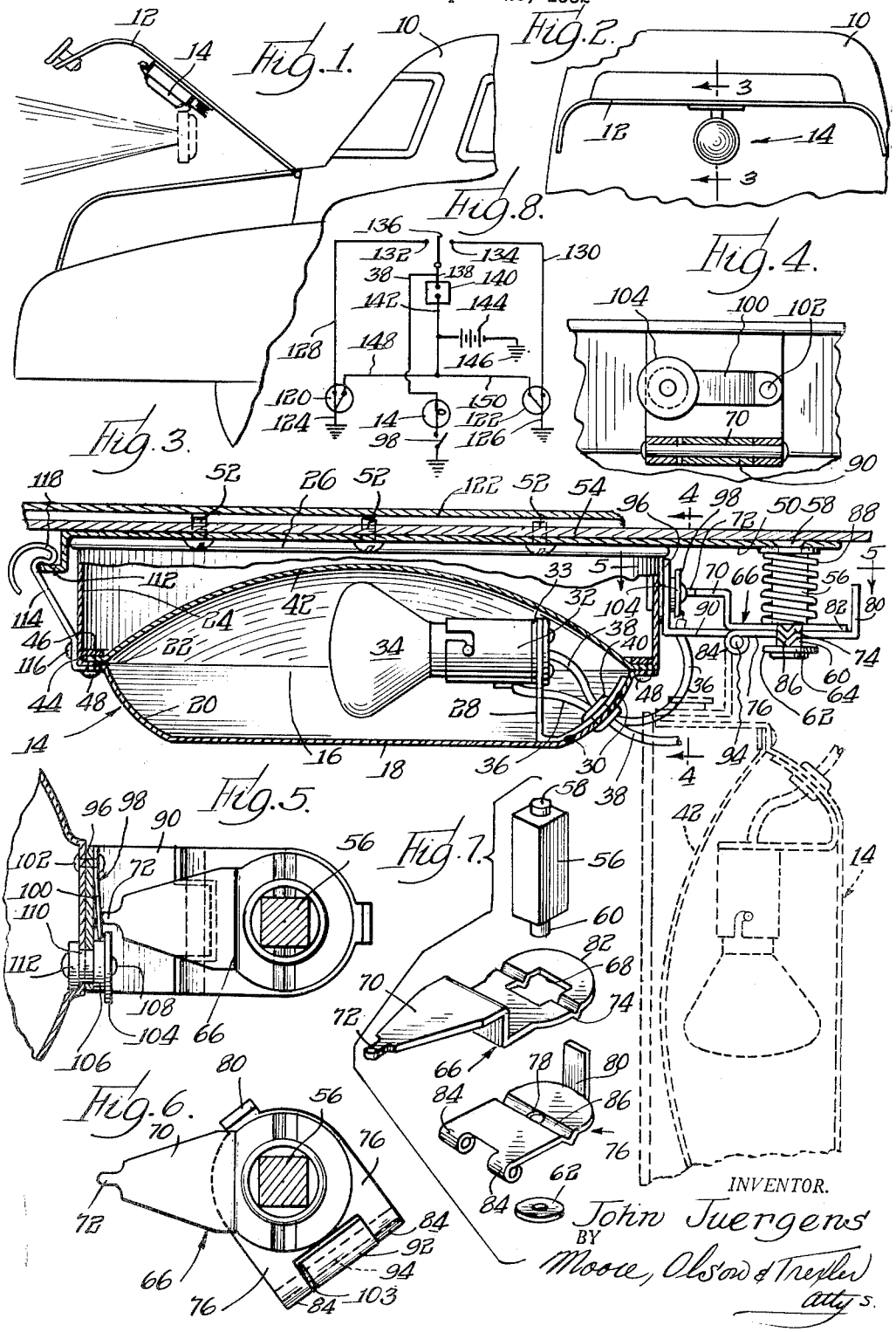

2,772,406

AUTOMOBILE SAFETY LAMP

John Juergens, Miami, Fla.

Application April 25, 1952, Serial No. 284,350

2 Claims. (Cl. 340—32)

This invention concerns a safety lamp for automobiles.

An object of this invention is to provide a new or improved safety lamp for automobiles to minimize the dangers resulting from stopping an automobile on or adjacent to a highway.

A more specific object of this invention is to provide a safety lamp secured to the underside of an automobile trunk lid or the like.

A further object of this invention is to provide an automobile safety lamp positioned beneath a trunk lid or the like and adjustable as to direction.

Another object of this invention is to provide an automobile safety lamp latchable in inoperative position and automatically lit upon being brought into operative position.

Other and further objects and advantages will be apparent from the following description when taken in connection with the drawings forming a part thereof wherein:

Fig. 1 is a fragmentary side view of an automobile showing my safety lamp in position;

Fig. 2 is a view similar to Fig. 1 and taken from the rear;

Fig. 3 is a cross-sectional view of the lamp taken substantially along the line 3—3 of Fig. 2;

Fig. 4 is a view of the switch mechanism partly in cross-section and taken along the line 4—4 of Fig. 3;

Fig. 5 is a top view of the switch mechanism and lamp pivot taken substantially along the line 5—5 of Fig. 3;

Fig. 6 is a fragmentary view similar to Fig. 5 showing the parts with the lamp pivoted to another position;

Fig. 7 is an exploded perspective view of the pivotal mounting parts of the lamp; and Fig. 8 is a schematic wiring diagram for the lamp.

Usually the first thing that a stalled motorist does to make roadside repairs on his automobile is to raise the trunk lid to get at his tools or the spare tire. Accordingly, I have placed my safety lamp on the under side of the trunk lid where it is in a protected position and out of the way when not in use and where it is held at a relatively elevated position to warn oncoming motorists when it is in use. It will, of course, be understood that an additional safety lamp may be provided beneath the hood of the automobile above the engine to warn oncoming motorists from the opposite direction, although the greatest danger is with regard to motorists approaching from the rear when the stalled automobile is on or just off the right side of the road.

Referring now to Fig. 1 there is shown generally the rear portion of an automobile 10 having a liftable trunk lid 12 of conventional construction. A safety lamp constructed according to the principles of my invention and designated generally by the numeral 14 is shown secured to the underside of the lid 12. The lamp 14 generally is held substantially flat against the under side of the lid as shown in solid line in Figs. 1 and 3 and is pivotal into operative position as shown in solid lines in Fig. 2 and in dashed lines in Figs. 1 and 3. With the lamp substantially flat against the under side of the trunk lid, the lamp is protected and out of the way.

Referring next to Fig. 3 for a description of the lamp and to other figures for certain details of construction, the lamp 14 may be seen to include a substantially cup-shaped sheet metal stamping 16 having a reflector portion comprising a flat rear wall 18 and a concave side wall 20. The cup-shaped sheet metal stamping 16 continues outwardly as a flange 22 from the concave portion 20 and then forwardly as a cylinder 24. The edge of the cylinder 24 is provided with a rounded bead 26.

A socket mounting bracket 28 is secured on the inside of the reflector portion of the stamping 16 by means such as spot welds 30. The bracket 28 supports a socket 32 of conventional construction adapted to receive the usual bayonet base bulb 34. The socket 32 is insulated from the bracket 28 by insulation 33. A pair of wires 36 and 38 passes through a rubber grommet 40 placed in an aperture in the stamping 16. The wires are connected to the socket in the usual manner, the wire 36 being grounded to the shell of the socket and the wire 38 being connected to the center contact.

A transparent or translucent lens 42 of glass or plastic covers the lamp bulb 34 and socket 32 and is provided with a peripheral flange 44 fitting against the flange 22 of the sheet metal housing or stamping 16. A ring 46 is clamped against the lens flange 44 by means such as screws 48 passing through the flange 22 and threaded into the ring 46. The lens flange 44 may terminate short of the screws 48 or in the case of the plastic lens, which is preferable, the lens flange 44 may be provided with apertures for accommodating the screws.

A flat mounting plate or bracket 50 is secured by means such as screws 52 to a rib 54 forming part of the framework of the lid 12. A polygonal stud 56 shown by way of illustration as having a square cross section (Figs. 5–7) through a major portion of its length has a cylindrical upper end 58 of reduced diameter fitting into an aperture in the plate or bracket 50 and peened over or otherwise firmly affixed to the plate 50. The opposite or lower end of the stud 56 is provided with an elongated cylindrical portion 60 of reduced diameter and a washer 62 is trapped on the lower end thereof by peening over the lower end as at 64.

A control member 66 is provided with a polygonal aperture 68 complementary in configuration to the stud 56 and fitting thereover. The control member 66 is provided with an upwardly offset and outwardly extending arm 70 tapering to a rounded off switch actuating tip 72. A transverse protuberance 74 is formed adjacent the aperture 68 in the control member 66 by stamping a section of the member down.

A hinge plate or leaf 76 is provided with a circular aperture 78 rotatably fitting over the cylindrical lower end 60 of the stud 56. The rear edge of the hinge leaf is provided with an upstanding flange 80 projecting past the semicircular rear edge 82 of the control member 66. The hinge leaf 76 is rolled over at its forward edge to form a pair of sleeves 84 for receiving a hinge pin. A transverse groove 86 is stamped across the hinge leaf 76 and intersecting the aperture 78 and is complementary in shape to the protuberance 74 of the control member 66. A coil spring 88 encircling the stud 56 forces the control member 66 down against the hinge leaf 76 normally to maintain the cooperating protuberance 74 and groove 86 in engagement so that the hinge leaf 76 is held in fixed position as shown in Figs. 3 and 5. The hinge leaf can be pivoted away from this position by shifting the control member 66 upwardly against the spring 88 to disengage the cooperating protuberance and groove 74 and 86. Pivotal movement of the hinge leaf 76 is limited by engagement of the flange 80 with the outwardly extending arm 70.

A second hinge leaf 90 is provided at its rear edge with a sleeve 92 fitting between the sleeves 84 of the hinge leaf 76. A pivot pin 94 passed through the aligned sleeves maintains the two hinge leaves in pivoted engagement. The forward edge of the second hinge leaf 90 is provided with an upstanding flange 96 which is riveted to the side of the sheet metal housing or stamping 16 as will be apparent hereinafter. A switch mechanism 98 is riveted to the flange 96 and includes a leaf spring contact 100 (Figs. 4 and 5) secured by one of the rivets 102 which hold together the housing 16 and second hinge leaf 90. The switch and arm 100 are grounded to the frame of the automobile through the rivet 102, hinge 90, hinge leaf 76, and the stud 56. A split ring lock washer 103 is included between the cylinder or sleeve 92 and one of the cylinders or sleeves 84 to insure a good electrical contact.

The switch mechanism 98 is completed by a washer 104 spaced from the flange 96 by an insulator 106. The washer is held in place by a rivet 108 passing through the washer 104, the insulator 106, and additional insulators 110 and 112. The wire 36 is attached to the washer 104 and the spring switch arm 100 normally tends to spring outwardly to contact the washer 104 and thus to ground the shell of the socket 32. The "hot" wire 38 may extend from the central pin of the socket through a fuse to the automobile battery so that the lamp bulb 34 is lit whenever the spring 100 contacts the washer 104. With the lamp 14 raised to substantially flat position against the under side of the lid as shown in solid lines in Fig. 3 the tip 72 of the control member 66 engages the spring contact 100 to move the same away from the washer 104 as shown in Fig. 5 and thus to open the circuit and extinguish the lamp bulb 34 automatically.

Preferably the "hot" wire 38 is connected as shown in Fig. 8. In this figure the conventional tail lights are indicated at 120 and 122. Each tail light is of the type having two filaments grounded to a common ground as at 124 and 126. The brake lights are connected through wires 128 and 130 to turn indicator contacts 132 and 134 engageable by a turn indicator switch arm 136. The arm is connected through a wire 138 to a flasher 140 of conventional construction which is connected by means of a wire 142 to the automobile battery 144, the opposite terminal of the battery being grounded as at 146. Wires 148 and 150 lead from the battery to the running light filaments of the tail lights 120 and 122.

The "hot" wire as shown in Fig. 8 is connected to the wire 138 leading to the flasher 140 so that the safety lamp 14 emits a flashing light whenever the switch 98 is closed. The flashing light attracts the attention of oncoming motorists some time before a steady light even though both are visible for the same distance.

The manner of connecting the "hot" wire 38 as illustrated in Fig. 8 and described above makes the safety lamp 14 flash independently of the turning signal lights. For convenience or some other reason, it may be desirable to connect the "hot" wire 38 in such a manner as to place the operation of the lamp 14 under the control of the turning indicator switch arm 136. Preferably the "hot" wire 38 is so connected that the lamp 14 operates when the switch arm 136 is in contact with the indicator contact 132 which operates the turning signal light on the left side of the vehicle which is normally adjacent the road when the vehicle is parked on the side of the road. It will be apparent that such operation of the lamp 14 may be provided by connecting the "hot" wire 38 either to the contact 132 or at any point along the wire 128 up to and including the point at which it is connected to the proper filament of the left tail light 120.

The mounting plate or bracket 50 is provided at the edge remotely disposed from the stud 56 with a locking flange 112 spaced from the rib 54. A spring latch 114 is riveted at its inner end at 116 to the sheet metal housing or stamping 16 and also is secured by one or more of the screws 48. The outer end of the spring latch 114 is bent at 118 to form a tooth engageable with the locking flange 112 to hold the lamp substantially flat against the under side of the trunk lid 12 as shown in solid lines in Fig. 3. Retraction of the tooth 118 from the locking flange 112 allows the lamp to swing down to the operative position shown in dotted lines in Figs. 1 and 3. The inherent balance of the lamp causes it to swing to vertical position to project a substantially horizontal beam even if the automobile should be pulled off the side of the road on to an incline.

The lens 42 as noted heretofore preferably is made of plastic but may be made of glass. The lens may be clear but preferably is red or amber better to serve as a warning indicator. The flat back portion 18 serves as a reflector for the lamp bulb 34 and either is highly polished or is provided with a reflective coating. The "hot" wire leading from the socket 32 has been indicated as leading through a fuse directly to the automobile battery, but it will be understood that any suitable or conventional flasher mechanism could be incorporated in this lead to provide a flashing signal rather than a steady light. The safety lamp has been shown applied beneath the trunk lid of an automobile but it will be understood that the lamp could be applied equally well beneath the hood or that two lamps could be applied beneath the hood and under the trunk lid.

Although a particular form of my invention has been shown and described, it will be understood that this is for illustrative purposes only and that my invention is to include all that which falls fairly within the spirit and scope of the appended claims.

I claim:

1. A lamp comprising a member adapted to be attached to an automobile, a polygonal stud on said member, said stud having an outer end circular in cross section, a locking member having a polygonal aperture fitting freely over said polygonal stud, a spring urging said locking member toward the free outer end of said stud, a hinge leaf having a circular aperture rotatably fitting over the outer end of said stud, means trapping said hinge leaf on the outer end of said stud, said locking member and said hinge leaf having cooperating protuberance and indent means normally held in engagement by said spring for locking said hinge leaf in a preselected position of adjustment, a hinge member pivotally attached to said hinge leaf, a lamp housing fixed on said hinge member, a source of illumination within said housing, and a light transmitting lens on said housing and covering said source of illumination.

2. A lamp comprising a member adapted to be attached to an automobile, a polygonal stud on said member, said stud having an outer end circular in cross section, a locking member having a polygonal aperture fitting freely over said polygonal stud, a spring urging said locking member toward the free outer end of said stud, a hinge leaf having a circular aperture rotatably fitting over the outer end of said stud, means trapping said hinge leaf on the outer end of said stud, said locking member and said hinge leaf having cooperating protuberance and indent means normally held in engagement by said spring for locking said hinge leaf in a preselected position of adjustment, a hinge member pivotally attached to said hinge leaf, said hinge member having an angularly disposed flange, a switch on said flange, an abutment member on said locking member for operating said switch as said hinge member is pivoted relative to said hinge leaf, a substantially cup-shaped sheet metal housing fixed to said hinge member, a bracket secured within said housing, a socket within said housing adapted to receive a lamp bulb, a light transmitting lens secured to said housing and coacting with said housing to enclose said socket, a spring latch on said housing, and a locking member on said member adapted to be attached to the automobile and cooperable with said spring latch for maintaining said lamp housing substantially flat against a surface of the automobile in inoperative position.

References Cited in the file of this patent

UNITED STATES PATENTS

| | | |
|---|---|---|
| 1,347,011 | Cochran | July 20, 1920 |
| 1,421,652 | Youngquist | July 4, 1922 |
| 1,761,345 | Isackson | June 3, 1930 |
| 2,054,919 | Anibal | Sept. 22, 1936 |
| 2,101,748 | Michel et al. | Dec. 7, 1937 |
| 2,128,679 | Kielian | Aug. 30, 1938 |
| 2,140,855 | Scott | Dec. 20, 1938 |
| 2,146,701 | Peterson | Feb. 7, 1939 |
| 2,165,562 | Mack et al. | July 18, 1939 |
| 2,218,442 | Thurber | Oct. 13, 1940 |
| 2,321,803 | Falge et al. | June 15, 1943 |
| 2,435,165 | Stelmack | Jan. 27, 1948 |

FOREIGN PATENTS

| | | |
|---|---|---|
| 911,667 | France | Mar. 25, 1946 |